US012421769B2

(12) United States Patent
Pohl et al.

(10) Patent No.: US 12,421,769 B2
(45) Date of Patent: Sep. 23, 2025

(54) CONTROL ASSEMBLY FOR OPERATING A MOTOR VEHICLE LOCKING SYSTEM

(71) Applicant: Brose Fahrzeugteile SE & Co. Kommanditgesellschaft, Bamberg, Bamberg (DE)

(72) Inventors: Florian Pohl, Ebersdorf (DE); Alexander Müller, Bischberg (DE); Mehdi Jaouhari, Bamberg (DE); Rene Bekendam, Remscheid (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 139 days.

(21) Appl. No.: 17/924,749

(22) PCT Filed: May 10, 2021

(86) PCT No.: PCT/EP2021/062273

§ 371 (c)(1),
(2) Date: Nov. 11, 2023

(87) PCT Pub. No.: WO2021/228741

PCT Pub. Date: Nov. 18, 2021

(65) Prior Publication Data

US 2024/0318474 A1 Sep. 26, 2024

(30) Foreign Application Priority Data

May 13, 2020 (DE) ..................... 10 2020 112 943.2

(51) Int. Cl.
*G08B 21/00* (2006.01)
*E05B 81/04* (2014.01)
(Continued)

(52) U.S. Cl.
CPC .............. *E05B 81/04* (2013.01); *E05B 81/64* (2013.01); *E05B 81/82* (2013.01)

(58) Field of Classification Search
CPC ........... E05B 81/04; E05B 81/64; E05B 81/82
(Continued)

(56) References Cited

U.S. PATENT DOCUMENTS 5,547,208 A * 8/1996 Chappell ................. E05B 77/12 180/281
6,056,076 A * 5/2000 Bartel ..................... E05B 81/54 180/271
(Continued)

FOREIGN PATENT DOCUMENTS

DE 3225039 A1 1/1984
DE 102005054111 A1 5/2007
(Continued)

OTHER PUBLICATIONS

International Search Report and English Translation of International Search Report for PCT/EP2021/062273, Dated Aug. 4, 2021, All together 5 Pages.
Written Opinion and English Translation of Written Opinion for PCT/EP2021/062273, Dated Aug. 12, 2021, All together 10 Pages.

*Primary Examiner* — Mark S Rushing
(74) *Attorney, Agent, or Firm* — Dickinson Wright PLLC

(57) ABSTRACT

A control assembly for operating a motor vehicle locking system, including an electric drive motor for providing a motorized locking function. The control assembly including a control circuit for controlling the electric drive in an adjustment routine, the control circuit is electrically disconnected from a chargeable energy store, and in an emergency operating mode, responsive to the reception of an operating signal, the control assembly connects the chargeable energy store to the control circuit to provide electrical energy for the adjustment routine, the control assembly includes a monitoring assembly monitoring a state of charge variable of the chargeable energy store in a monitoring routine. The control assembly includes a trigger circuit which, responsive to satisfying a predefined trigger criterion and irrespective of
(Continued)

the reception of the operating signal, connects the chargeable energy store to the monitoring assembly to provide electrical energy for the monitoring routine.

20 Claims, 2 Drawing Sheets

(51) Int. Cl.
*E05B 81/64* (2014.01)
*E05B 81/82* (2014.01)
(58) Field of Classification Search
USPC .......................................................... 340/5.72
See application file for complete search history.

(56) References Cited

U.S. PATENT DOCUMENTS

| | | | | |
|---|---|---|---|---|
| 2007/0145821 | A1* | 6/2007 | Mekky | E05B 81/54 307/10.1 |
| 2008/0000711 | A1* | 1/2008 | Spurr | E05B 77/30 180/289 |
| 2015/0330111 | A1* | 11/2015 | Dente | E05B 81/86 701/49 |
| 2018/0051493 | A1* | 2/2018 | Krishnan | G07C 9/00182 |

FOREIGN PATENT DOCUMENTS

| | | | |
|---|---|---|---|
| EP | 0694664 | A1 | 1/1996 |
| EP | 1873335 | A2 | 1/2008 |
| WO | 2005047628 | A1 | 5/2005 |

* cited by examiner

Supply a)

b)

CONTROL ASSEMBLY FOR OPERATING A MOTOR VEHICLE LOCKING SYSTEM

CROSS-REFERENCE TO RELATED APPLICATIONS

This application is the U.S. National Phase of PCT/EP2021/062273 Filed May 10, 2021, which claims priority to German Application No.: DE 10 2020 112 943.2 filed May 13, 2020, the entire disclosures of which are incorporated by reference herein.

TECHNICAL FIELD

The present disclosure relates to a control assembly for operating a motor vehicle locking system.

BACKGROUND

Motor vehicle locking systems may be used in all types of motorized locking functions for closing elements of a motor vehicle. These include in particular closing elements such as side doors, rear doors, tailgates, trunk lids, engine hoods or the like. These closing elements may in principle be designed as swinging or sliding doors. The motorized locking function also relates in particular to a motor vehicle lock assigned to the motor vehicle locking system. Further examples of the locking functions in question of a motor vehicle are drive assemblies that provide motorized adjustment of the abovementioned closing elements.

A motor vehicle locking system may include an electric drive with an electric drive motor for providing the motorized locking function for the adjustable closing element. In order to take into consideration the requirements in terms of the reliability of the voltage supply for such motor vehicle locking systems, and in particular motor vehicle locks, the control assembly is equipped with a chargeable energy store, as a result of which the electrical energy supply to a control circuit for controlling the electric drive is ensured even in an emergency operating mode, in particular if the central battery of the motor vehicle fails.

However, in the emergency operating mode of the motor vehicle, the control circuit may initially be electrically disconnected from the chargeable energy store in order to avoid premature discharging of the energy store on account of the comparatively high quiescent energy requirement of the control circuit. Only in response to the reception of an operating signal, which is generated for example by the operator of the motor vehicle actuating a door handle, does the control assembly connect the chargeable energy store to the control circuit for the purpose of supplying electrical energy. The control circuit can then control the electric drive.

In principle, it is advantageous if the control assembly has a monitoring assembly which monitors a state of charge variable of the chargeable energy store in a monitoring routine. The monitoring of the state of charge variable is used, in particular, to detect a low state of charge of the energy store so that the remaining energy in the energy store can be reserved for a predefined adjustment operation, for example for emergency opening of the motor vehicle lock.

The problem here however is that a certain energy requirement of the monitoring assembly is likewise associated with the monitoring routine, with the result that the monitoring assembly is usually disconnected from the energy supply provided by the energy store in the emergency operating mode. Reliable monitoring of the state of charge and detection of an imminent complete discharge of the energy store are therefore no longer ensured.

SUMMARY

The present disclosure is based on the problem of designing and developing a control assembly for operating a motor vehicle locking system in such a manner that the state of the energy store is monitored reliably.

According to one or more embodiments, it is possible to reliably monitor the energy store even in the emergency operating mode if the monitoring assembly is, for example, specifically and temporarily supplied with energy, irrespective of whether or not there is an operating signal from the motor vehicle locking system.

As an example, it is proposed that the control assembly has a trigger circuit which, in response to a predefined trigger criterion being satisfied and irrespective of the reception of the operating signal, connects the chargeable energy store to the monitoring assembly for the purpose of providing electrical energy for the monitoring routine.

In another embodiment, a subcriterion of the trigger criterion is defined by the control assembly detecting the presence of the emergency operating mode of the motor vehicle. The energy for the monitoring assembly is therefore expediently supplied via the trigger circuit only in the emergency operating mode.

In yet another embodiment, the trigger criterion may relate to the presence of an operator in or at the motor vehicle, with the result that the monitoring routine is also carried out, for example, only when there is a risk of the operator being locked in. This achieves a further energy saving with a high degree of safety for the operator at the same time.

In one or more embodiments, an operating signal which has already been received is taken into account. If there has hitherto been no such operating signal in the emergency operating mode, it can usually be assumed that the state of charge of the energy store is still sufficiently high, such that it is not absolutely necessary to carry out the monitoring routine. If, in contrast, an operating signal has been issued, an adjustment routine has already been carried out. This indicates that the energy store has possibly already been discharged to a further extent, with the result that the performance of the monitoring routine is initiated.

In one or more embodiments, a time controller causes at least one subcriterion of the trigger criterion to be satisfied in a time-dependent manner, for example cyclically, as a result of which time-controlled triggering of the monitoring routine, for example at regular intervals of time, can be implemented.

In another embodiment, the control circuit may include the monitoring assembly. According to one or more embodiments, the trigger circuit may likewise have the monitoring assembly, whereby the monitoring assembly can be designed independently of the control circuit in order to achieve a further energy saving.

In another embodiment, the trigger criterion is defined on the basis of a previously captured state of charge variable, with the result that the monitoring routine is primarily carried out, for example, in the case of a low state of charge of the energy store.

It is also particularly expedient if the state of charge variable relates to an electrical charge and/or an electrical voltage of the chargeable energy store. The energy store for example has at least one capacitor, such as at least one double-layer capacitor.

In another embodiment, a further energy saving can be achieved by virtue of the fact that, the monitoring assembly has a comparator for comparing the state of charge variable with a reference variable, such as a reference voltage. In this case, provision may be made for only the comparator to be operated until a low state of charge occurs, which comparator can manage with a low power consumption.

According to another embodiment, which is of independent significance, a motor vehicle locking system having an electric drive with an electric drive motor and a proposed control assembly is claimed as such. Reference can therefore be made to all statements made with respect to the proposed control assembly.

In one or more embodiments, a motor vehicle lock for the closing element of the motor vehicle is also provided, wherein the electric drive is provided for the motorized lifting of the pawl of the motor vehicle lock. In this case, the proposed solution is particularly advantageous in view of the special security requirements imposed on motor vehicle locks.

According to yet another embodiment, which is likewise of independent significance, a method for operating a motor vehicle locking system, for example, by means of a proposed control assembly, is claimed as such. In this respect, reference can also be made to all statements made with respect to the proposed control assembly and with respect to the proposed motor vehicle locking system.

BRIEF DESCRIPTION OF THE DRAWINGS

The invention is explained in more detail below on the basis of a drawing which illustrates only an exemplary embodiment and in which.

DETAILED DESCRIPTION OF EMBODIMENTS

Figure 1:
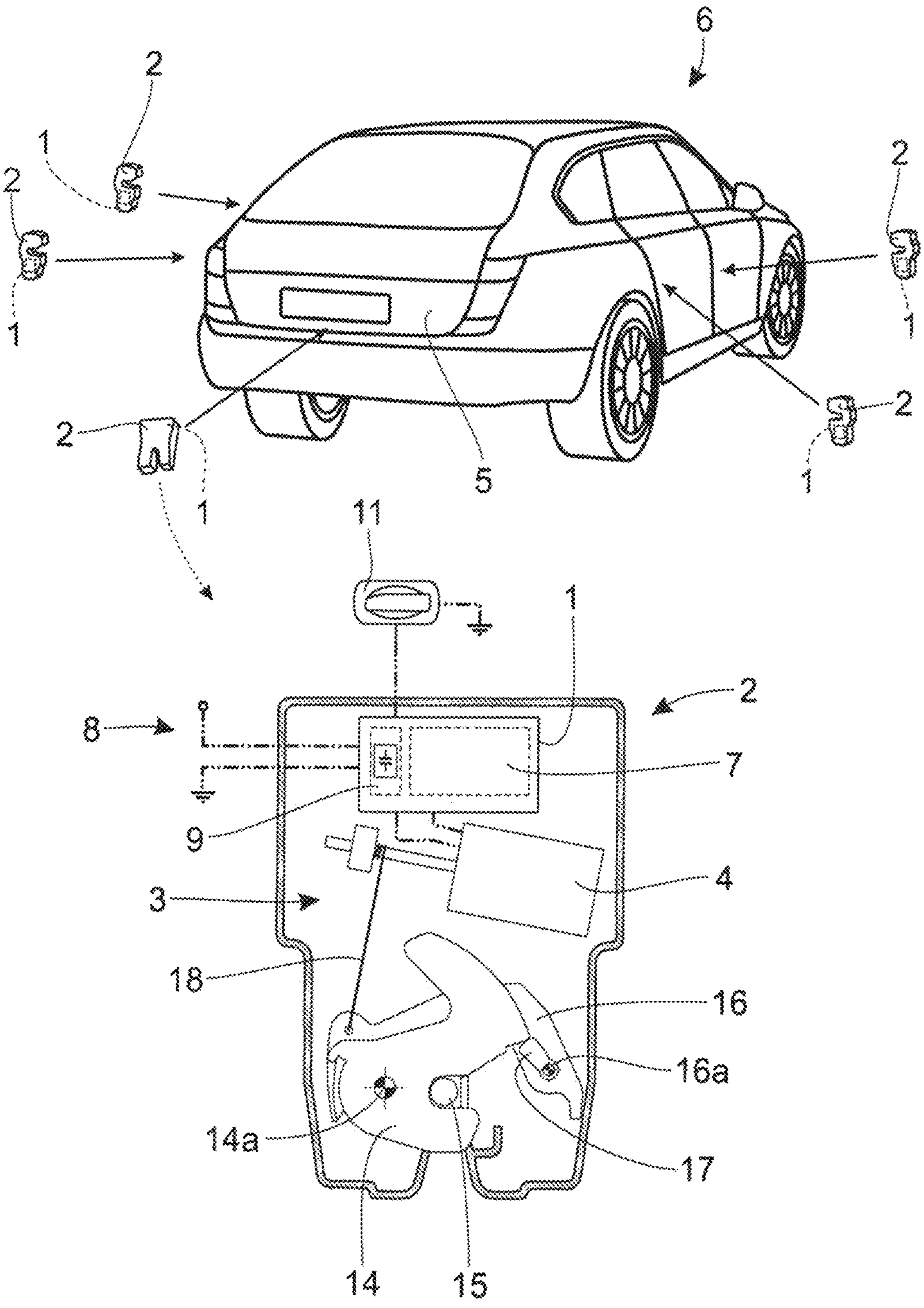
FIG. 1 shows a schematic perspective illustration of a motor vehicle having proposed motor vehicle locking systems, which have motor vehicle locks, and a motor vehicle lock in a partially disassembled side view.

According to a first teaching, the present disclosure relates to a control assembly 1 for operating a motor vehicle locking system 2. The motor vehicle locking system 2 has an electric drive 3 with an electric drive motor 4, wherein the electric drive 3 is fed, in the normal operating mode, by a normal supply voltage in order to provide a motorized locking function for an adjustable locking element 5 of the motor vehicle 6.

A motorized locking function should be understood to mean that the adjustable closing element 5 of the motor vehicle 6 is adjusted, is opened or closed, and/or is locked or unlocked, directly or indirectly by a movement generated by the electric drive 2.

With regard to the design of the closing element 5, reference may be made to the introductory statements, wherein, here by reference to FIG. 1, the method of operation of the motor vehicle locking system 2 is explained for a closing element 5 in the form of a tailgate. However, all statements likewise apply to all other types of closing elements 5 of the motor vehicle 6.

FIGS. 2*a*) and *b*) show schematic illustrations of the control assembly 1. The control assembly 1 is equipped with a control circuit 7 for controlling the electric drive 3 in an adjustment routine. The control circuit 7 here has an electronic control system for implementing the control tasks that arise in connection with the motorized locking functions and is configured to control the electric drive 3.

The control circuit 7 is provided with electrical energy, in particular for carrying out the adjustment routine, via an energy supply 8 for normal operation of the motor vehicle 6. The energy supply 8 for normal operation is here an electrical supply voltage of the electrical system of the motor vehicle 6 that may be provided by the central battery of the motor vehicle 6. The central battery is the battery which also provides the electrical energy needed to start the motor vehicle 6 and/or for the driving mode of the motor vehicle 6.

Figure 2:
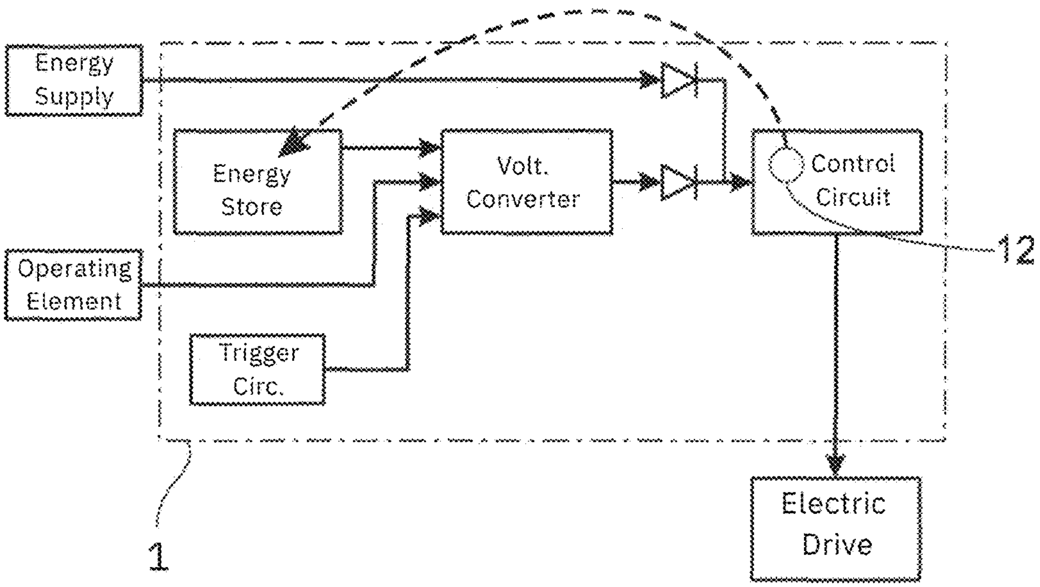
FIG. 2 shows schematic illustrations a) of a first configuration of a proposed control assembly and b) of a second configuration of a proposed control assembly.
Figure 2:
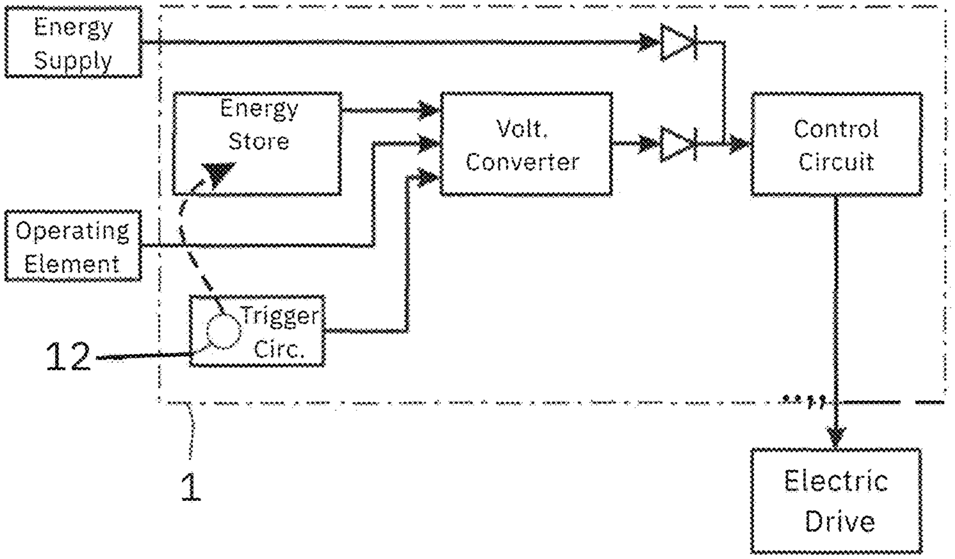

As is clear from FIG. 2, the control assembly 1 has a chargeable energy store 9, wherein the chargeable energy store 9 can provide an electrical emergency supply voltage for the electric drive 3 in an emergency operating mode, in particular if the central battery fails. In this case, however, the control circuit 7 is electrically disconnected from the chargeable energy store 9 of the control assembly 1. In the present case, a voltage converter 10, for example, a boost converter, is provided for the chargeable energy store 9 and converts the voltage provided by the chargeable energy store 9 into the emergency supply voltage. In this case, the voltage converter 10 can be deactivated and disconnects the electrical connection between the chargeable energy store 9 and the control circuit 7 in order to avoid discharging of the energy store 9 on account of the quiescent energy requirement of the control circuit 7 and possible leakage currents.

During normal operation, the control circuit may be supplied only via the energy supply 8. However, in the emergency operating mode, in response to the reception of an operating signal, the control assembly 1 connects the chargeable energy store 9 to the control circuit 7 for the purpose of providing an electrical energy for the adjustment routine. Instead of or in addition to the voltage converter 10, however, other electronic switching components may also be provided for the purpose of disconnecting and connecting the energy store 9 from/to the control circuit 7.

In this case, the operating signal is triggered by actuation of an operating element 11, for example a door handle. For this purpose, the operating element 11 is equipped with a sensor or the like which detects actuation of the operating element 11 and forwards the detection to the control assembly 1 via a control-related connection. In the present case, in response to the reception of the operating signal, the voltage converter 10 is activated and the energy store 9 is connected to the control circuit 7 in order to supply the control circuit 7 with energy even in the emergency operating mode, as a result of which the electric drive 3 can in turn be controlled in response to the received operating signal.

The control assembly 1 has a monitoring assembly 12 which monitors a state of charge variable of the chargeable energy store 9 in a monitoring routine. As already mentioned at the outset, the monitoring of the state of charge variable may be used to detect a low state of charge of the energy store 9. If there is a low state of charge, provision may be made, for safety reasons, for only certain aspects of the motorized locking function to be available and/or for an adjustment routine to be automatically triggered by means of the control assembly 1 so that the energy remaining in the energy store 9 is used, for instance, for functions which are particularly relevant to safety.

The important factor is now that the control assembly 1 has a trigger circuit 13 which, in response to a predefined trigger criterion being satisfied and irrespective of the reception of the operating signal, connects the chargeable energy store 9 to the monitoring assembly 12 for the purpose of providing electrical energy for the monitoring routine.

Irrespective of the reception of the operating signal in this case means that the energy store 9 is not necessarily connected only in response to the reception of the operating signal. Rather, the trigger circuit 13 causes the connection in response to the trigger criterion being satisfied even when there is no operating signal. In response to the predefined trigger criterion being satisfied, the trigger circuit 13 controls an electronic switching component, here the voltage converter 10, to close an electrical connection for transmitting energy between the energy store 9 and the control circuit 7.

At least one subcriterion of the trigger criterion may be defined by the control assembly 1 detecting the presence of the emergency operating mode. As already mentioned, the emergency operating mode is, in particular, failure of the central battery of the motor vehicle 6, whereby the energy supply 8 for normal operation is no longer ensured. In this case, the central battery can be monitored by means of the control assembly 1 for the satisfaction of an emergency operating mode criterion, for example whether the battery voltage of the central battery falls below a predefined minimum value. The emergency operating mode may likewise also be a crash of the motor vehicle 6, which is detected, for example, by means of a sensor assembly which is assigned to the motor vehicle 6 and is not illustrated.

According to a further configuration, at least one subcriterion of the trigger criterion is defined by the control assembly 1 capturing a sensor signal relating to the presence of an operator. The sensor signal may be captured by means of a sensor assembly which is assigned to a seat of the motor vehicle, is not illustrated here and, in a simple configuration, has a switch which is closed by the weight force of the operator on the seat.

Provision may likewise be made for at least one subcriterion of the trigger criterion to relate to presence information relating to the operator that is stored in the control assembly 1. The control assembly 1 may include a memory for the presence information, which memory is set on the basis of the sensor signal from the sensor assembly. Therefore, even if the sensor assembly fails, the energy store can be connected depending on the presence of an operator in the emergency operating mode by reading the presence information from the memory.

Provision may be made for at least one subcriterion of the trigger criterion to be defined by the control assembly 1 already having received an operating signal in the emergency operating mode. The control assembly 1 may again have a memory which is accordingly set by the reception of an operating signal and is read when checking the trigger criterion.

According to a further configuration, the trigger circuit 13 has a time controller, and the time controller causes at least one subcriterion of the trigger criterion to be satisfied in a time-dependent manner. For this purpose, the trigger circuit 13 may have a timer and may monitor whether the running time output by the timer exceeds a predefined period, whereby the connection is carried out and the timer is restarted. The time controller may cyclically causes at least the subcriterion of the trigger criterion to be satisfied. In this case, cyclically means that the subcriterion is considered to have been satisfied at predefined intervals of time, with the result that the monitoring routine can be carried out regularly. In this case, the length of the intervals of time can also be predefined depending on whether there is an emergency operating mode, an operator is present and/or the control assembly 1 has already received an operating signal in the emergency operating mode, in order to further improve the energy saving.

According to the configuration which is illustrated in FIG. 2*a*) and, for example, in this respect, the control circuit 7 has the monitoring assembly 12. The monitoring assembly 12 is integrated, in particular, in the control circuit 7, for example in a common integrated circuit, whereby the structure of the control assembly 1 can be simplified. Here, it may be the case that the trigger circuit 13 connects the chargeable energy store 9 to the control circuit 7, in response to the predefined trigger criterion being satisfied, for the purpose of providing electrical energy, whereby the monitoring assembly 12 is also supplied with electrical energy for the monitoring routine.

According to a further configuration which is illustrated in FIG. 2*b*), the trigger circuit 13 has the monitoring assembly 12. The monitoring assembly 12 may be separate from the control circuit 7 and can therefore also be retrofitted to an already existing control assembly 1.

In a further configuration of the proposed control assembly 1, at least one subcriterion of the trigger criterion can be defined on the basis of the state of charge variable previously captured in the monitoring routine. At least one subcriterion of the trigger criterion may be defined by the previously captured state of charge variable falling below a predefined minimum value. In this case, the minimum value may be representative of a further discharge of the energy store 9 being foreseeable, with the result that monitoring of the energy store is initiated. This subcriterion can be advantageously combined with further subcriteria, in which case the time controller is triggered when the subcriterion relating to the state of charge variable is satisfied, for example.

The state of charge variable may relate to an electrical charge of the chargeable energy store 9. The energy store 9 may include at least one capacitor, such as at least one double-layer capacitor. Such a double-layer capacitor is also referred to as a “supercapacitor”, “supercap”, “ultracap” or the like. The state of charge variable may also relate to an electrical voltage of the chargeable energy store 9, for example the capacitor voltage.

According to a further configuration, the monitoring assembly has a comparator for comparing the state of charge variable with a reference variable, in particular a reference voltage. A comparator, in particular for comparing voltage values, may have a very low electrical power requirement.

According to a further teaching, which is of independent significance, the abovementioned motor vehicle locking system 2 is claimed as such. The motor vehicle locking system 2 has an electric drive 3 with an electric drive motor 4 for providing a motorized locking function for an adjustable closing element 5 of a motor vehicle 6 and a proposed control assembly 1. In this respect, reference may be made to all statements made with respect to the proposed control assembly 1.

According to another configuration, the motor vehicle locking system 2 has a motor vehicle lock for the adjustable closing element 5 of the motor vehicle 6. The motor vehicle lock is illustrated in a partially disassembled side view in FIG. 1. The motor vehicle lock belonging to the motor vehicle locking system 2 is equipped with a lock latch 14, which can be pivoted about a lock latch axis 14*a*, for the holding engagement with a locking part 15 and a pawl 16 which is assigned to the lock latch 14 and can be pivoted about a pawl axis 16*a*. The locking part 15 may be a locking bracket, a locking bolt or the like. For example, the motor vehicle lock is arranged on a closing element 5, whereas the locking part 15 is arranged on the motor vehicle 6 in a manner fixed to the body.

The pawl 16 can be brought into a dropped position, illustrated in FIG. 1, in which it holds the lock latch 14 in the illustrated locked position by way of a pawl mandrel 17. The pawl 16 can also be lifted in a motorized manner by way of the electric drive 3. For this purpose, the drive motor 4 may be connected to the pawl 16 by a drive cable 18. The motorized lifting of the pawl 16 in FIG. 1 is a pivoting of the pawl 16 about the pawl axis 16*a* in the clockwise direction. The pawl 16 may in principle also be part of a pawl system consisting of two or more sequentially arranged pawls and assigned to the lock latch 14. The motorized lifting of the pawl 16 is triggered for example by actuating the operating element 11, here the door handle.

In addition to or instead of the locking function of the motor vehicle lock, as explained in more detail here, the motor vehicle locking system 2 may likewise have a drive assembly for the motorized adjustment of an abovementioned closing element 5 of the motor vehicle 6, wherein the drive assembly is used for motorized adjustment, in particular opening and/or closing, of the closing element 5. Further examples of locking functions are motorized adjustment of operating elements such as operating levers, door handles and interior elements and exterior elements of the motor vehicle such as fan elements, interior mirrors, side mirrors, lighting or the like. In this respect too, reference can be made to the statements made with respect to the proposed control assembly 1.

According to a further teaching, which is likewise of independent significance, a method for operating a motor vehicle locking system 2 is claimed as such. The important factor in this case is that the chargeable energy store 9 is connected to the monitoring assembly 12 by means of a trigger circuit 13 of the control assembly 1 in response to a predefined trigger criterion being satisfied and irrespective of the reception of the operating signal, for the purpose of providing electrical energy for the monitoring routine. In this respect too, reference may be made to all statements made with respect to the proposed control assembly 1 and with respect to the proposed motor vehicle locking system 2.

The invention claimed is:

1. A control assembly for operating a motor vehicle locking system, the motor vehicle locking system including an electric drive provided with an electric drive motor configured to perform a motorized locking function for an adjustable closing element of a motor vehicle, the control assembly comprising:

- a chargeable energy store;
- a control circuit configured to control the electric drive during an adjustment routine, the control circuit is configured to be electrically disconnected from the chargeable energy store of the control assembly, and, in an emergency operating mode, in response to receiving an operating signal, the control assembly is configured to connect the chargeable energy store to the control circuit to provide electrical energy for the adjustment routine;
- a monitoring assembly configured to monitor a state of charge variable of the chargeable energy store during a monitoring routine; and
- a trigger circuit configured to, responsive to a predefined trigger criterion being satisfied, connect the chargeable energy store to the monitoring assembly to provide the electrical energy for the monitoring routine.

2. The control assembly of claim 1, wherein at least one sub criterion of the trigger criterion is defined by the control assembly detecting the emergency operating mode.

3. The control assembly of claim 1, wherein at least one sub criterion of the trigger criterion is defined by the control assembly capturing a sensor signal indicative of a presence of an operator.

4. The control assembly of claim 1, wherein at least one sub criterion of the trigger criterion is defined by the control assembly previously receiving another operating signal in the emergency operating mode.

5. The control assembly of claim 1, wherein the trigger circuit includes a time controller configured to satisfy at least one sub criterion of the trigger criterion in a time-dependent manner.

6. The control assembly of claim 1, wherein the control circuit includes the monitoring assembly, and the trigger circuit, in response to satisfaction of the predefined trigger criterion being satisfied, connects the chargeable energy store to the control circuit to provide electrical energy for the monitoring routine.

7. The control assembly of claim 1, wherein at least one sub criterion of the trigger criterion is defined based on a state of charge variable previously captured in the monitoring routine.

8. The control assembly of claim 1, wherein the state of charge variable relates to at least one of an electrical charge and an electrical voltage of the chargeable energy store.

9. The control assembly of claim 1, wherein the monitoring assembly includes a comparator configured to compare the state of charge variable with a reference variable.

10. A motor vehicle locking system having comprising:

- an electric drive including an electric drive motor configured to provide a motorized locking function for an adjustable closing element of a motor vehicle; and
- the control assembly of claim 1.

11. The motor vehicle locking system of claim 10, further comprising:

- a motor vehicle lock configured to lock the adjustable closing element the motor vehicle lock including a lock latch and a pawl, the lock latch configured to engage and hold a locking part, wherein the electric drive is configured to provide motorized lifting of the pawl.

12. A method of operating a motor vehicle locking system, the motor vehicle locking system including a drive provided with an electric drive motor, configured to provide a motorized locking function for an adjustable closing element of a motor vehicle, a control assembly including a control circuit configured to control the electric drive during an adjustment routine, the control circuit electrically disconnected from a chargeable energy store of the control assembly the method comprising:

- receiving, by the control assembly, an operating signal;
- operating the control assembly in an emergency operating mode;
- connecting, by the control assembly, the chargeable energy store to the control circuit, in response to the receiving step, to provide electrical energy for the adjustment routine;
- monitoring, by a monitoring assembly, a state of charge variable of the chargeable energy store;
- connecting, by a trigger circuit of the control assembly, the chargeable energy store to the monitoring assembly in response to satisfaction of a predefined trigger criterion to provide the electrical energy for the monitoring routine.

13. The method of claim 12, wherein the connecting step is performed irrespective of the operating signal.

14. The control assembly of claim 1, wherein the trigger circuit is further configured to connect the chargeable energy store to the monitoring assembly irrespective of receiving the operating signal.

15. The control assembly of claim 2, wherein the emergency operating mode is triggered in response to at least one of a failure of a central battery of the motor vehicle and a crash of the motor vehicle.

16. The control assembly of claim 1, further comprising:

a sensor assembly configured to detect an occupant disposed in a seat of the motor vehicle, wherein at least one sub criterion of the trigger criterion is based on the detection of the occupant disposed in the seat of the motor vehicle.

17. The control assembly of claim 5, wherein the time controller is configured to cyclically satisfy the at least the sub criterion of the trigger criterion.

18. The control assembly of claim 6, wherein the trigger circuit includes the monitoring assembly.

19. The control assembly of claim 2, wherein the at least one sub criterion of the trigger criterion is based on a previously captured state of charge variable falling below a predefined minimum value.

20. The control assembly of claim 9, wherein the reference variable is a reference voltage.

* * * * *